(12) United States Patent
Yan et al.

(10) Patent No.: US 7,757,207 B2
(45) Date of Patent: Jul. 13, 2010

(54) FORM SKIN AND DESIGN TIME WYSIWYG FOR .NET COMPACT FRAMEWORK

(75) Inventors: Xin Yan, Bellevue, WA (US); Keira L. Amos, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1014 days.

(21) Appl. No.: 10/922,580

(22) Filed: Aug. 20, 2004

(65) Prior Publication Data

US 2006/0041858 A1 Feb. 23, 2006

(51) Int. Cl.
*G06F 9/44* (2006.01)
*G06F 3/00* (2006.01)
*G06F 3/048* (2006.01)
*G06F 9/45* (2006.01)
*G06G 7/62* (2006.01)

(52) U.S. Cl. .................. 717/109; 717/106; 717/108; 717/100; 717/105; 717/124; 717/125; 717/126; 703/13; 703/21; 703/22; 715/762; 715/763; 715/764

(58) Field of Classification Search .............. 717/105, 717/113, 125, 126, 134, 135, 138, 109; 715/763, 715/769; 345/650, 651; 703/4, 20, 21
See application file for complete search history.

(56) References Cited

U.S. PATENT DOCUMENTS

| | | | | |
|---|---|---|---|---|
| 5,327,529 A * | 7/1994 | Fults et al. | ................. | 715/762 |
| 6,477,539 B1 * | 11/2002 | Smith | ................. | 707/103 R |
| 7,050,056 B2 * | 5/2006 | Meyringer | ................. | 345/440 |
| 7,254,627 B2 * | 8/2007 | Hain | ................. | 709/223 |
| 2002/0077823 A1 * | 6/2002 | Fox et al. | ................. | 704/260 |
| 2002/0087300 A1 * | 7/2002 | Patwari | ................. | 703/22 |
| 2002/0169591 A1 * | 11/2002 | Ryzl | ................. | 703/24 |
| 2003/0208748 A1 * | 11/2003 | Levin et al. | ................. | 717/134 |
| 2003/0236657 A1 * | 12/2003 | Ryzl | ................. | 703/23 |
| 2004/0027326 A1 * | 2/2004 | Hays et al. | ................. | 345/106 |
| 2004/0027377 A1 * | 2/2004 | Hays et al. | ................. | 345/760 |
| 2004/0027378 A1 * | 2/2004 | Hays et al. | ................. | 345/763 |

(Continued)

OTHER PUBLICATIONS

MindSites Group, "iconverse unveils," Apr. 30, 2001.*

(Continued)

*Primary Examiner*—Insun Kang
(74) *Attorney, Agent, or Firm*—Woodcock Washburn LLP

(57) ABSTRACT

A WYSIWYG visual programming environment for programming applications for portable computer devices is provided. The developer selects a form skin based on the underlying portable computer device that the developer intends the application to execute on. The form skin appears to the developer as a graphic modeled after the actual device. The developer is able to drag and drop GUI elements onto the form, where they appear at approximately the same size and resolution as they would to the user of the actual device, regardless of the resolution used on the developer's computing device. The developer is able to associate code with the GUI elements, as well as any softkeys that appear on the form skin. The developer is able to test the application by emulating the hardware of the portable device, and operating the device using the form skin. Through the form skin, the developer is able to see nearly exactly how the application will look and operate on the underlying portable device without having to leave the development environment.

23 Claims, 5 Drawing Sheets

U.S. PATENT DOCUMENTS

| | | | | |
|---|---|---|---|---|
| 2004/0133848 | A1* | 7/2004 | Hunt et al. | 715/500 |
| 2004/0236547 | A1* | 11/2004 | Rappaport et al. | 703/2 |
| 2005/0076327 | A1* | 4/2005 | Helal et al. | 717/100 |
| 2005/0172261 | A1* | 8/2005 | Yuknewicz et al. | 717/106 |
| 2005/0192013 | A1* | 9/2005 | Perrot et al. | 455/445 |
| 2005/0193370 | A1* | 9/2005 | Goring et al. | 717/115 |
| 2005/0262452 | A1* | 11/2005 | Sauermann | 715/853 |
| 2005/0278354 | A1* | 12/2005 | Gupta et al. | 707/100 |
| 2007/0234223 | A1* | 10/2007 | Leavitt et al. | 715/762 |

OTHER PUBLICATIONS

Sun Microsystems, User's Guide Wireless Toolket version 2.1, Dec. 2003.*

Knudsen, The J2ME Wireless Toolkit 2.1, Dec. 2003, Sun Microsystems.*

Newman, "Java MIDP 2.0 developer tool review," revision 2.0, Feb. 2004.*

Jones, "Mobile/PocketPC Development Jump Start1," CodeGuru, Jun. 22, 2004.*

Jones, "Mobile/PocketPC Development Jump Start2," CodeGuru, Jun. 22, 2004.*

Jones, "Mobile/PocketPC Development Jump Start3," CodeGuru, Jun. 22, 2004.*

Hartson, H.R. et al., "The UAN: A User-Oriented Representation for Direct Manipulation Interface Designs", *ACM Transactions on Information Systems*, 1990, 8(3), 181-203.

Mayora-Ibarra, O. et al., "A Visual Programming Environment for Device Independent Generation of User Interfaces", *Proceedings of the Latin-American Conference on Human-Computer Interaction*, Aug. 2003, 61-68.

Lauridsen, O., "Design of GUIs from Programming Perspective", *Proceedings of the Conference on TRI-Ada*, 1994, 236-245.

Miyashita, K. et al., "Declarative Programming of Graphical Interfaces by Visual Examples", *Proceedings of the $5^{th}$ Annual ACM Symposium on User Interface Software and Technology*, 1992, 107-116.

Miyashita, K. et al., "Interactive Generation of Graphical User Interfaces by Multiple Examples", *Proceedings of the $7^{th}$ Annual ACM Symposium on User Interface Software and Technology*, 1994, 85-94.

Myers, B.A., "Creating User Interfaces using Programming by Example, Visual Programming, and Constraints", *ACM Transactions on Programming Languages and Systems*, Apr. 1990, 12(2), 143-177.

Schneiderman, B., "Direct Manipulation for Comprehensible, Predictable and Controllable User Interfaces", *Proceedings of the $2^{nd}$ International Conference on Intelligent User Interfaces*, 1997, 33-39.

Vlissides, J.M. et al., "A Unidraw-Based User Interface Builder", *Proceedings of the $4^{th}$ Annual ACM Symposium on User Interface Software and Technology*, 1991, 201-210.

* cited by examiner

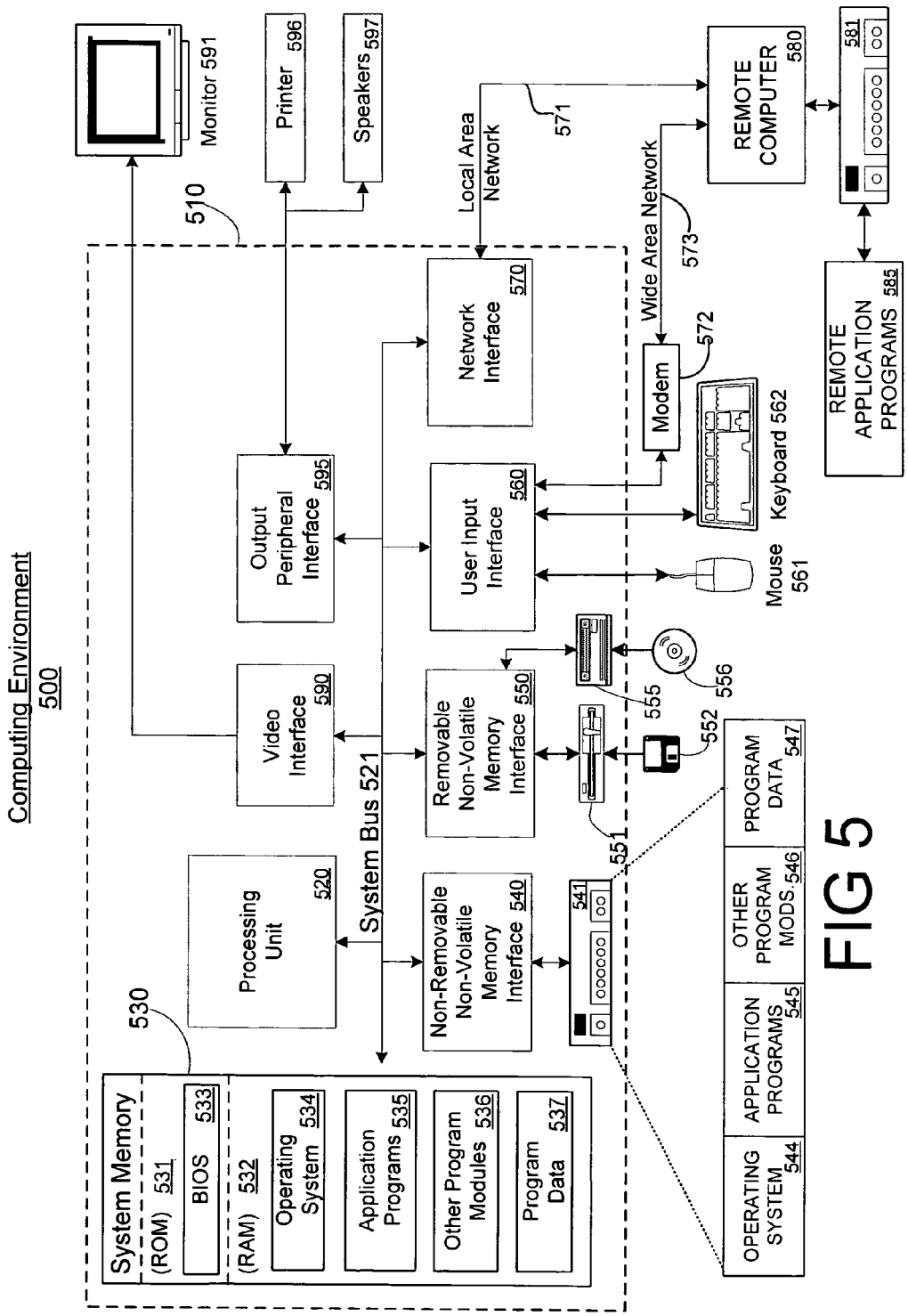

FORM SKIN AND DESIGN TIME WYSIWYG FOR .NET COMPACT FRAMEWORK

FIELD OF THE INVENTION

The invention relates to the field of computer programming. More specifically, the invention relates to visual programming environments for creating software designed to run on portable devices such as cellular phones or personal digital assistants ("PDA").

BACKGROUND OF THE INVENTION

As technology advances and computers are becoming ever faster and smaller, there has been an increase in the number of portable computer devices available in the market. These devices range from palm top computers, essentially miniature laptops, to PDAs. As the computing power and memory capabilities of the devices increase, users are demanding access to more powerful software applications.

Programmers attempting to program complex software applications quickly find that traditional visual software development systems are unsuitable for programming applications to run on the myriad of devices available. Specifically, given the multitude of variations of interfaces, screen sizes, and resolutions among the portable computer devices, it can be very difficult for a programmer to ensure that a particular chosen graphical user interface ("GUI") will appear and work correctly on multiple devices. In addition, the developer is often working in the resolution environment of the desktop computer, making it more difficult for the programmer to visualize how a particular GUI will work on the screen of the portable computer device.

Typically, programmers of portable computer devices alternate between programming on a desktop, and running the software on an emulator of the device, or the actual device, to see if the GUI operates as expected. This can be time consuming and inefficient, especially if a programmer wishes to port the application to a wide variety of portable devices.

What is needed is a real time, what you see is what you get ("WYSIWYG") visual computing environment that allows programmers to see how a particular application will look on a particular device as they program the application in real time.

SUMMARY OF THE INVENTION

The present invention provides systems and methods for a real time WYSIWYG visual development environment for portable computing devices.

The present invention provides a design time WYSIWYG environment that allows developers to place user interface ("UI") elements (controls) in a form of a form skin corresponding to a portable device. Developers can dynamically switch the orientation (portrait or landscape) and resolution of the form skin and UI elements, as well as change the form skin to a different portable device. Switching the orientation, resolution, and form skin in the design environment saves developers time because they no longer need to run and test the application UI on the various devices.

The developer is presented with a form skin that is designed to closely resemble, in both size and appearance, the selected portable computing device. The form skin comprises a form, a skin, and a plurality of softkeys. The developer programs the application by selecting UI elements and placing them inside the form. Control designer components are provided for each UI element, such that the desktop UI elements are rendered to appear similar to the UI elements displayed by the portable computer device represented by the form skin. The form is desirably designed to appear at approximately the same resolution to the developer as the screen of the actual portable device. This allows the developer to immediately see how the completed application will appear to the end user as the developer programs.

Once the developer has finished designing the application, the developer is able to immediately test the application on both landscape and portrait orientations, as well as on other portable devices. Because each form skin appears to the developer at about the same size as the actual device, the developer is able to immediately see how the application will look on a variety of devices by switching form skins and form orientations in the same visual development environment.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 5 is a block diagram showing an exemplary computing environment in which aspects of the invention may be implemented.

DETAILED DESCRIPTION OF ILLUSTRATIVE EMBODIMENTS

Figure 1:
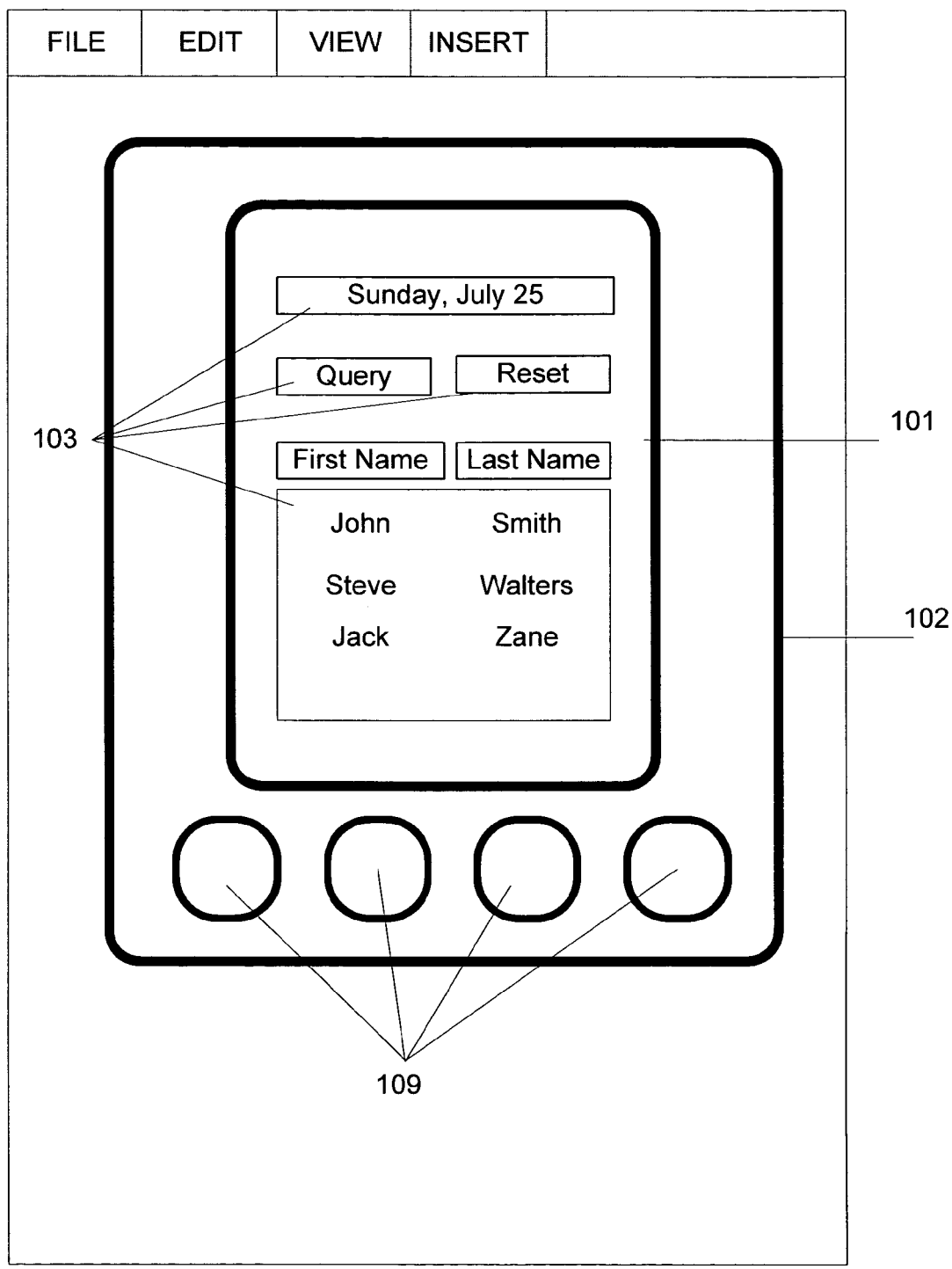
FIG. 1 is an illustration of an exemplary screen shot in accordance with the present invention.

FIG. 1 is an illustration of an exemplary form skin designer in accordance with the present invention. As shown, the design system features a form 101, a skin 102, one or more UI controls 103, and one or more softkeys 109.

The form 101 represents the actual program or application that the developer is creating. The form 101's size, shape, and orientation is determined by the display of the underlying device or hardware that the developer is programming the particular application to execute on. In the example shown in FIG. 1, the developer has chosen to program an application for a PocketPC. As a result, a form is generated with a size and resolution approximately equal to that of the display of the particular PocketPC selected. In particular, the chosen form 101 is desirably displayed in such a way, that the developer sees the form at approximately the same resolution, and the same approximate size, as the ultimate user of the application. For example, if the PocketPC has a screen resolution of 240×320 pixels, the form 101 desirably has a matching resolution of about 240×320 pixels.

Surrounding the form 101 is the skin 102 corresponding to the device that the developer has chosen to program the application to execute on. The skin 102 is desirably designed to appear similar to, and at approximately the same size as the device it is modeled on, giving the developer the ability to see nearly exactly how the application will look to the end user of the application.

The developer environment desirably contains a plurality of form 101 and skin 102 pairs, each pair corresponding to a different portable computer device. A developer may select the desired computer platform or device for the application by selecting the appropriate form 101 and skin 102 pair. Each form 101 and skin 102 pair comprises a form skin.

The skin 102 desirably features a number of softkeys 109. A softkey 109 is a representation of a hardware button that interacts with software menus on the portable device. Each softkey 109 desirably corresponds to an actual hardware key found on the device that the skin 102 is modeled after. The developer is desirably able to assign or program code for each softkey 109, allowing the developer to specify what action takes place in the application when the particular softkey 109 is selected.

UI elements 103, for example buttons, text boxes or check boxes, are desirably added to the form 101 by the developer. Desktop UI elements typically have a different appearance and behavior from the portable device UI elements. For example, a text box appears differently to a Windows user, than a PocketPC user. In order to provide a consistent appearance and function between the desktop UI elements and the portable device UI elements, control designer components are desirably created to modify the desktop control behavior and appearance so that they match the portable device runtime behavior and appearance. A separate control designer component is desirably created to render each type of UI element 103 supported by the portable device. For example, a control designer component is created to render a text box in the desktop environment in the same way as a text box in the portable device environment. Similarly, a control designer component is desirably created to render a radio button in the desktop environment in the same way as a radio box in the portable device environment. The control designer components, corresponding to the chosen portable device, are desirably loaded when the user selects the form skin.

The form skin is desirably represented by an XML file containing the name of the underlying graphic file, such as a bitmap, that is displayed, as well as orientation information including the locations and size of the various softkeys 109, if any. In addition, a particular device may include a touch screen for receiving input from a stylus, for example. The form skin file can also contain the location and dimensions of such a touch screen if desired.

Each of the form skins and related components can be provided by the manufacturer of the associated portable computing device, for example. Manufacturers are desirably provided with the specifications of the XML file and the associated graphic file used to represent the form skin. The manufacturers can then model a form skin based on each of their portable computing devices. The XML file and associated graphics file can then be distributed to developers, allowing them to design applications for the devices. Manufacturers desirably provide the form skins to developers ahead of the release of the portable computer devices to the general public, allowing developers to create applications before the devices are available. This ensures that sufficient software will be available for a device when it is released.

In order to aid discoverability of the various softkeys 109 and to encourage developers to use them, the cursor is desirably configured to change appearance when it passes over one of the softkeys 109. For example, the cursor can change into a hand to indicate that the end user will be able to interact with the particular softkey 109.

In addition to changing the cursor, a tooltip is desirably shown when the developer passes the cursor over one of the softkeys 109. The tooltip is desirably a message box containing some useful information about the particular softkey 109 being passed over. The tooltip desirably includes the name of the softkey 109, as well as any code or value that may represent that particular key. In addition, any other information that may be associated with the softkey 109 can be displayed. The tooltip that is displayed for each softkey 109 is desirably contained in the XML file associated with the particular form skin.

When a developer clicks on (or otherwise selects) a particular softkey 109 the developer is desirably directed towards an event handler, such as the KeyDown event handler. A KeyDown event is desirably triggered when a developer or user presses one of the softkeys 109 while executing the application. When the developer is working on the application in the design environment, pressing one of the softkeys 109 desirably allows the developer to view the code that the KeyDown event handler will invoke during run time. The developer is desirably able to add additional code to the event handler, as well as edit the preexisting code that may be provided by default.

Figure 2:
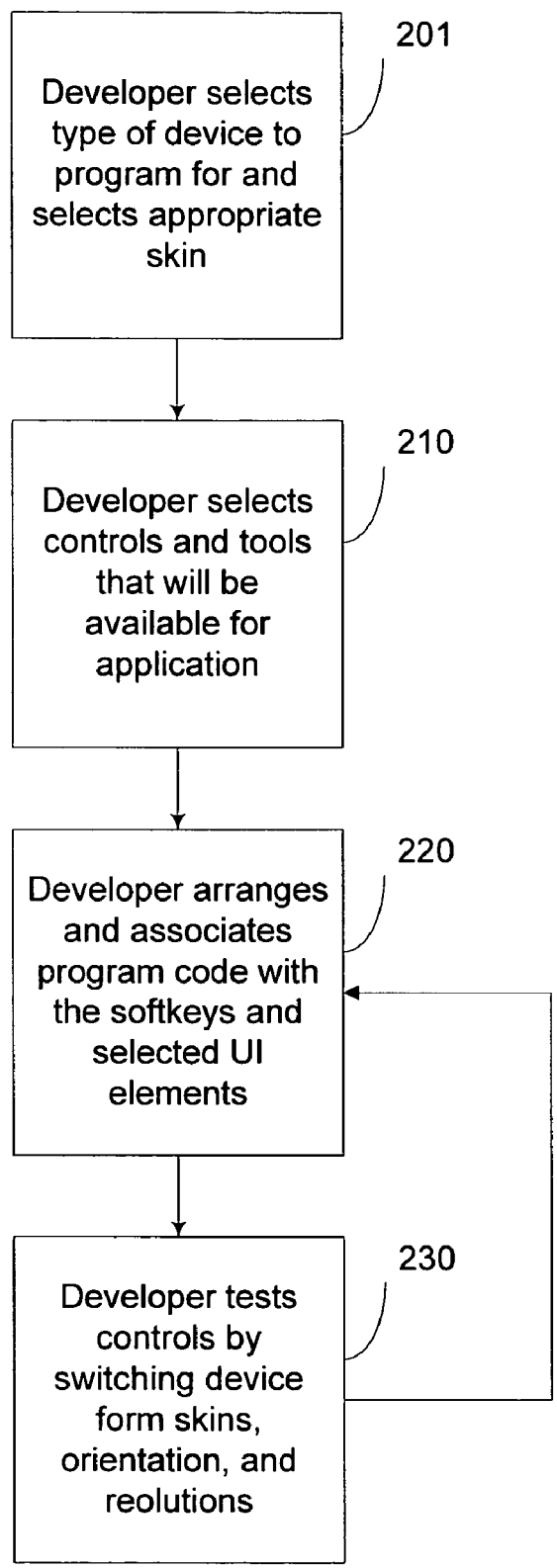
FIG. 2 is a flow diagram illustrating an exemplary method for designing and testing an application in accordance with the present invention.

FIG. 2 is a flow diagram illustrating an exemplary method for designing and testing an application in accordance with the present invention. A user or developer selects the form skin corresponding to the portable computing device that the developer is programming the application to execute on. The developer drags and drops (or otherwise selects) UI elements 103 into the form 101. The developer associates code with each of the UI elements 103 as well as any softkeys 109. The developer is able to test the application on a variety of devices and orientations by switching form skins and orientations to emulate different target devices the application may run on. The developer is able to test the application at the same resolution as the ultimate end user of the application without leaving the design environment. The developer desirably alternates between different form skins and orientations until the developer is satisfied that the application is suitable for a variety of devices and resolutions.

At 201, a developer determines which device the developer will be programming the application for. Depending on the device chosen, the developer desirably selects a form skin corresponding to the device. As shown in FIG. 1, the developer is desirably presented with a form 101 corresponding to the resolution of the selected device screen, as well as a skin 102 designed to look like the device, surrounding the form 101. The form 101 is desirably displayed to the developer at approximately the same resolution as the underlying device, regardless of the ultimate resolution being used by the developers on their development computers or workstations.

In addition, since some portable computers are able to operate in either portrait or landscape orientation, the developer is desirably able to orient the form 101 in either the portrait or landscape mode.

At 210, the developer desirably selects the controls and tools that will be available to the end user as part of the application user interface. In an embodiment of the invention, after choosing the appropriate form skin, the developer is presented with a window containing various UI elements 103 available for use in the application user interface. These can include, but are not limited to buttons, text boxes, scroll bars, or any other items that can be used to construct a user interface. The developer desirably selects the desired UI elements 103 by dragging them, and placing them into the form 101.

Because the developer is working in a desktop environment, the UI elements 103 normally would appear for the developer as the UI elements 103 appear on the desktop, and not as they would appear on the portable device. To provide a true WYSIWYG development environment, it is desirable that the UI elements 103 instead appear to the developer as they would on the portable device. As described with respect to FIG. 1, control designer components are provided for each UI element 103. The control designer components render each UI element 103 placed in the form 101 to appear (and behave) nearly exactly as they would on the portable device.

The specific UI elements 103 available for use in the application user interface can vary depending on the device selected. For example, depending on the underlying device's memory capabilities or interface type, some forms of user interfaces may be ill suited for that particular device. The user or developer is desirably restricted to constructing the user interface using only the UI elements 103 suited for that particular device.

In addition, the particular producer of the portable computer device being programmed for may desire a particular consistency, or look and feel, of applications designed to run on their device. In order to achieve this, the developer may only be presented with UI elements 103 to incorporate into the GUI that are pre-selected by the producer of the portable computer device.

After the developer has selected the appropriate UI elements 103 for the user interface the developer may then arrange the UI elements 103 and program the underlying code that is associated with each element at 220.

At 220, the developer can begin to arrange and associate program code with the selected UI elements 103, as well as any softkeys 109, as described with respect to FIG. 1. Each item in the user interface can be associated with multiple pieces of code, that will execute when engaged by the end user. For example, a button may be assigned a piece of code that will display a text box every time a user selects a button on the touch screen.

For each user interface item, the developer is desirably presented with a listing of all of the behaviors associated with that item. The developer is desirably able to associate separate pieces of code to execute for each of the separate behaviors.

Similarly, the developer may associate code with each of the softkeys 109 on the form skin. Each softkey 109 may have a default behavior associated with it. For example, a particular button may be designated as a back or exit button, allowing the user to exit an application. However, the developer is desirably free to assign alternate program code to each of the softkeys 109. After assigning code to all of the UI elements 103, and the softkeys 109, the developer desirably tests the application at 230.

At 230, the developer desirably tests the application on different portable devices, resolutions, and device orientations. As described above in FIG. 1, the developers are able see how particular UI elements 103 will look on a different device by selecting a different form skin for the application. After selecting a different form skin, the control designer components corresponding to each of the UI elements 103 on the selected form skin are desirably loaded. As described with respect to FIG. 1, each UI element 103 desirably has an associated control designer component that causes the associated UI elements 103 to appear similar to the UI elements on the portable device that the form skin is modeled after, rather than as they are displayed on the desktop. Accordingly, when the new control designer components are loaded the UI elements 103 in the form 101 desirably update to appear similar to the UI elements on the portable device corresponding to the newly selected form skin. Switching device form skin, orientation, and resolution allows the developer to see nearly exactly how the designed application will operate when used by the user on a variety of device types, resolutions and orientations, without leaving the design environment.

It is desirable that the developer be able to switch back and forth between different form skins, resolutions, and orientations as the developer makes changes to the selection and placement of the UI elements 103 as desired. Accordingly, the developer desirably alternates between 220 and 230 as desired (e.g., until the application is complete).

Figure 3:
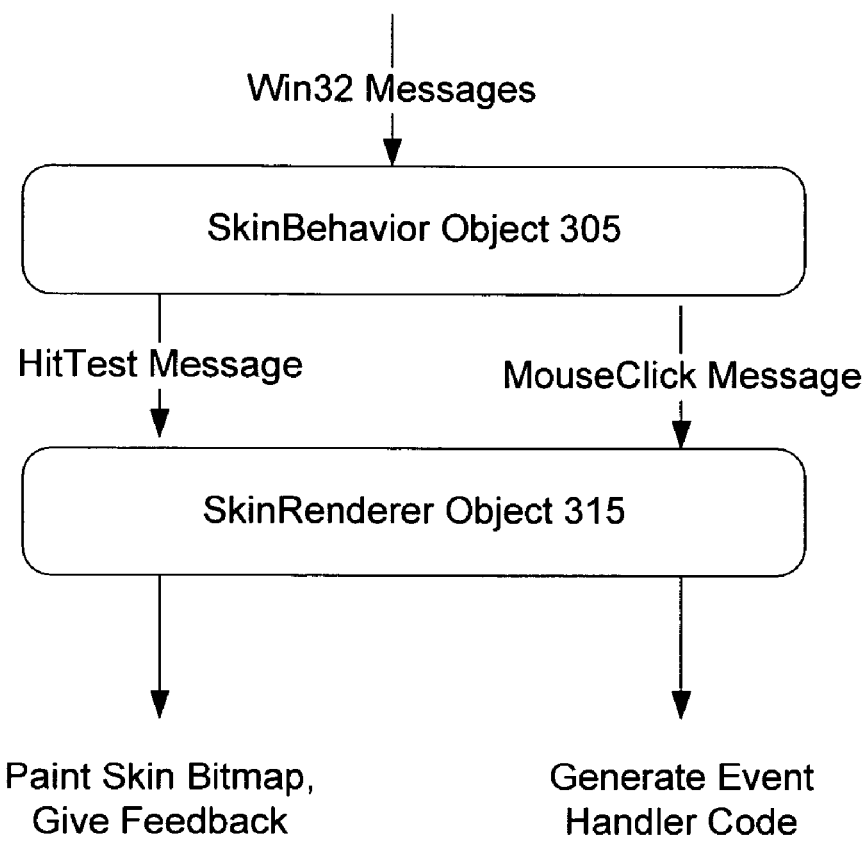
FIG. 3 is a block diagram illustrating an exemplary message passing hierarchy between an operating system and a form skin in accordance with the present invention.

FIG. 3 is a block diagram illustrating an exemplary message passing hierarchy between the operating system and a form skin in accordance with the present invention. The system as shown features a SkinBehavior Object 305 and a SkinRenderer Object 315.

The SkinBehavior Object 305 is desirably responsible for filtering received Win32 messages from the operating system. A feature of modern operating systems is that they allow applications or programs to pass messages to one another through the operating system messaging system. In Windows, Win32 messages are frequently passed through the operating system. While the development system that the developer is currently working in, such as Visual Studio, may receive several Win32 messages from a variety of programs, the form skin is desirably only interested in Win32 messages that may require an update to the skin 102, or require the display of code. Therefore, the SkinBehavior Object 305 desirably only forwards messages to the SkinRenderer Object 315 that may require a skin update or handling of a click event, such as MouseClick messages and HitTest messages, for example.

The SkinRenderer Object 315 is desirably responsible for rendering and displaying the skin image, as well as handling the messages passed to it from the SkinBehavior Object 305. As shown, the SkinRenderer Object 315 receives both HitTest messages and MouseClick messages from the Skin Behavior Object 305. Depending on the message sent, the SkinRenderer Object 315 can generate the event handler code associated with the hardware button or update the skin image and give feedback as desired. If it is HitTest message and the current cursor location is on top of a softkey 109, the SkinRenderer object 315 will desirably change the shape of the cursor, to a hand for example, and desirably display the tooltip associated with the particular softkey 109. If it is a MouseClick message on the softkey 109, the SkinRenderer object 315 desirably displays the event handler code associated with the particular softkey 109. This is described in further detail with respect to FIG. 4.

Figure 4:
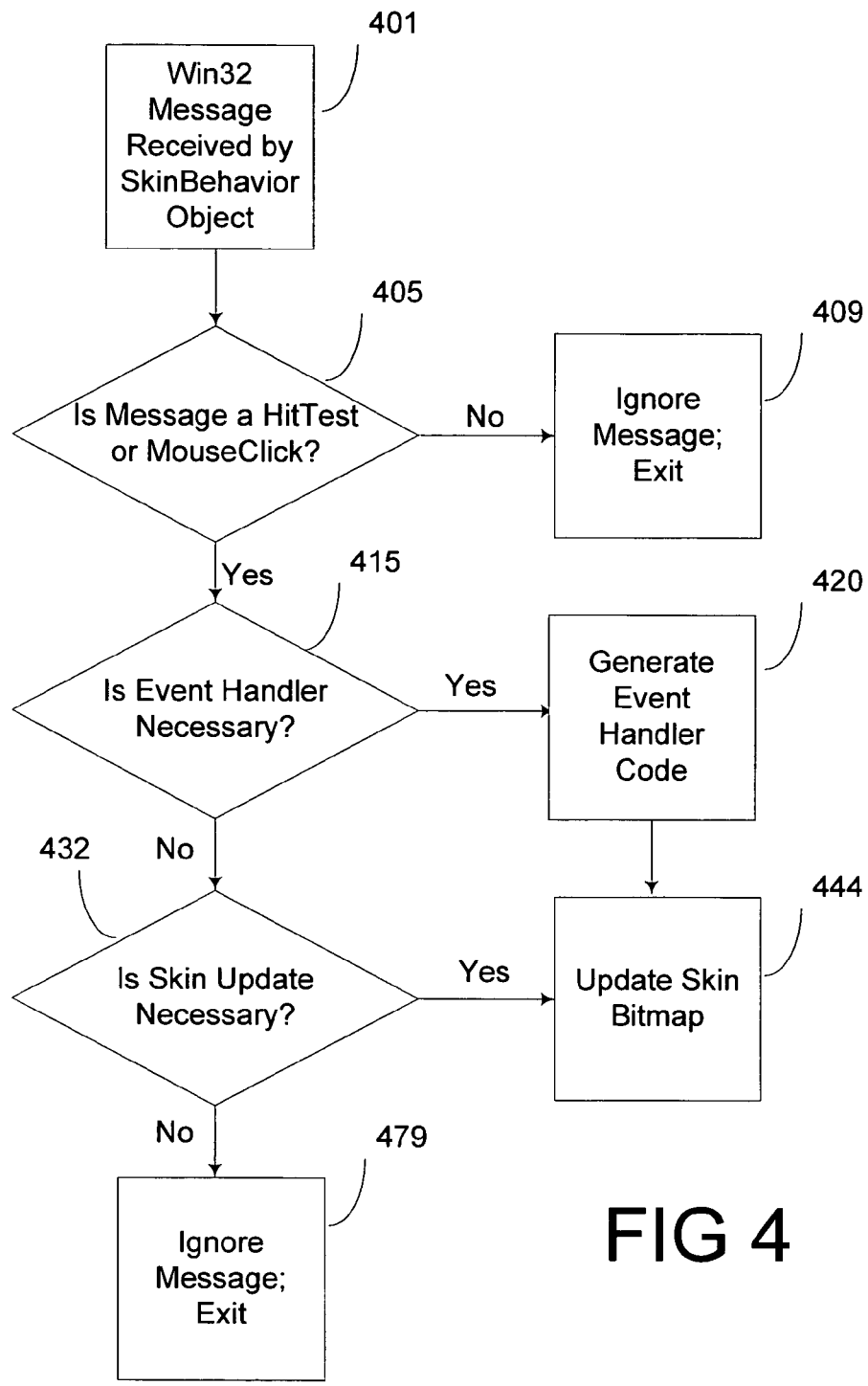
FIG. 4 is a flow diagram illustrating an exemplary method of interacting with a form skin in accordance with the present invention.

FIG. 4 is a flow diagram illustrating an exemplary method of interacting with a form skin in a design environment in accordance with the present invention. Win32 messages are received by a SkinBehavior Object. The SkinBehavior Object filters messages that may involve an update to the form skin, or the display of event handler code. Messages that may involve an update of the form skin or display of event handler code are passed to the SkinRenderer Object. The SkinRenderer Object determines if a skin update or handling of an event is to be performed.

At 401, a Win32 message is received by the SkinBehavior Object 305. As discussed with respect to FIG. 3, the SkinBehavior Object 305 receives Win32 messages from the operating system, for example. Most of the messages can be ignored by the SkinBehavior Object 305, because they do not affect the form skin.

At 405, the SkinBehavior Object 305 desirably determines if the message is a HitTest or a MouseClick message, for example. MouseClick messages indicate the position and status of the mouse, or other input device, and when a user has clicked. HitTest messages are used to indicate whether the tooltip should be displayed and if the cursor needs to be updated to indicate that the area is interactive. If the message is neither a HitTest message or a MouseClick message, the message is desirably ignored at 409. Otherwise the message is passed to the SkinRenderer Object 315 at 415.

At 415, the SkinRenderer Object 315 has received the Win32 message and desirably determines if event handler code is displayed. In general, event handler code is displayed if a user selects one of the softkeys 109 or interacts with one of the UI elements 103. In order to determine if this is the case, the system can compare the coordinates of the mouse click, if any, contained in the Win32 message with the coordinates of the softkeys 109 or UI elements 103. As described above with respect to FIG. 1, these coordinates can be contained in an XML file associated with the particular skin 102. If the mouse coordinates supplied by the Win32 message fall within the borders of one of the softkeys 109, and there was a selection, then the embodiment can proceed to 420 where the event handler code can be retrieved and displayed.

At 420, the event handler code corresponding to the selected softkey 109 or UI element 103 is desirably retrieved for display. The developer is desirably presented with the application code associated with the particular softkey 109 or UI element 103. The event handler code that is generated was desirably assigned to the selected softkey 109 or UI element 103 by the developer during the design of the application. As discussed herein, this information is desirably contained in an XML file corresponding to the form skin. Once the event handler code has been retrieved, the skin bitmap is desirably updated to display the code at 444.

At 432, the SkinRenderer Object 315 desirably determines if an update to the skin 102 is to be displayed on the screen. In general, if no event handler display was necessary, the skin 102 will update if the cursor has moved over a softkey 109, in which case a tooltip may be displayed and the cursor may change to indicate that the softkey 109 is interactive. In order to determine if this is the case, the system desirably compares the coordinates of the mouse position contained in the Win32 message with the coordinates of the softkeys 109. If the mouse coordinates supplied by the Win32 message fall within the borders of one of the softkeys 109, then the embodiment can proceed to 444 where the skin bitmap can be updated to display the tooltip. Otherwise, there is no need to update the skin and the embodiment can exit at 479.

At 444, the SkinRenderer Object 315 desirably updates the skin bitmap to reflect the changes to the skin 102. Once the updated skin is displayed, the SkinRenderer Object 315 desirably waits for another message from the SkinBehavior Object 305.

Exemplary Computing Environment

FIG. 5 illustrates an example of a suitable computing system environment 500 in which the invention may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing the invention includes a general purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 510 typically includes a variety of computer readable media. Computer readable media can be any available media that can be accessed by computer 510 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or non-volatile memory such as ROM 531 and RAM 532. A basic input/output system 533

(BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/non-volatile computer storage media. By way of example only, FIG. 5 illustrates a hard disk drive 540 that reads from or writes to non-removable, non-volatile magnetic media, a magnetic disk drive 551 that reads from or writes to a removable, non-volatile magnetic disk 552, and an optical disk drive 555 that reads from or writes to a removable, non-volatile optical disk 556, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted include a LAN 571 and a WAN 573, but may also include other networks. Such networking environments are commonplace in offices, enterprise-wide computer networks, intranets and the internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A method for programming an application via a form skin within a development environment comprising a plurality of form skins, each form skin of the plurality of form skins corresponding to a different portable computer device on which the application will execute, the method comprising:

selecting a form skin representing a respective portable computer device on which the application is executable, wherein the selected form skin is modeled to represent a physical image of the respective portable computer device;

selecting a form skin orientation, wherein the form skin orientation is either a portrait mode or a landscape mode;

selecting one or more graphical user interface items from a list of graphical user interface items;

placing the one or more graphical user interface items into the selected form skin by dragging and dropping the selected one or more graphical user interface items to the selected form skin;

associating an application code with the one or more graphical user interface items placed into the form skin, wherein the form skin comprises:

a form corresponding to a screen on the portable computer device, wherein the form is displayed on the development environment of a computing device appearing as the same size and resolution as the screen of the portable computer device; and a skin corresponding to a body of the portable computer device, wherein the skin surrounds the form, and is displayed on the computing device appearing as the same size as the body of the portable computer device; and testing the placed one or more graphical user interface items within the development environment, wherein the development environment, in response to the selecting and placing, enables filtering one or more messages that require a skin update or handling of a click event received from an operating system of the computing device and forwarding the one or more messages to a skin renderer object that determines if the skin update or handling of the click event is to be performed, renders, and displays a skin image based on the determination.

2. The method of claim 1, wherein testing the placed one or more graphical user interface items comprises selecting a different form skin orientation and determining if the placed one or more graphical user interface items display correctly.

3. The method of claim 1, wherein testing the placed one or more graphical user interface items comprises selecting a different form skin and determining if the placed one or more graphical user interface items display correctly on the different form skin.

4. The method of claim 1, wherein placing the one or more graphical user interface items to the form skin comprises placing the one or more graphical user interface items into the form.

5. The method of claim 1, wherein the form skin further comprises a softkey, wherein the softkey corresponds to an input on the body of the portable computer device.

6. The method of claim 5, wherein associating the code with the one or more graphical user interface items further comprises associating the code with the softkey.

7. The method of claim 1, wherein the list of graphical user interface items includes only items suitable for use on the portable computer device.

8. The method of claim 1, wherein the one or more graphical user interface items appear similar to corresponding graphical user interface items on the portable computer device.

9. The method of claim 1, wherein the list of graphical user interface items is pre-selected by a manufacturer of the portable computer device.

10. The method of claim 1, wherein the click event may comprise a Mouseclick message or a HitTest message.

11. A system for programming applications via a form skin, the system comprising:

a computing device, comprising a display and an input device;

a programming environment executing on the computing device;

a plurality of form skins, comprised within the programming environment, each form skin of the plurality of form skins corresponding to a different portable computer device on which the application will execute;

a plurality of graphical user interface objects, wherein the plurality of graphical user interface items are placed into the form skin by selecting and dragging the plurality of graphical user interface items, wherein each of the plurality of graphical user interface objects has an associated application code; and a plurality of designer object components, each designer object component corresponding to a graphical user interface object, wherein each of the plurality of form skins comprises:

a form, capable of receiving the graphical user interface objects, and corresponding to a screen of the portable computer, wherein the form appears as the same in size and resolution as the screen of the portable computer on the display of the computing device; and a skin, corresponding to a body of the portable computer, wherein the skin appears as the same in size as the body of the portable computer on the display of the computing device; and a SkinBehavior Object configured to filter one or more messages that require a skin update or handling of a click event received from an operating system of the computing device in response to the placing and forward the one or more messages to a SkinRenderer object wherein the SkinRenderer Object is configured to determine if the skin update or handling of the click event is to be performed, render and display a skin image based on the determination wherein the placed graphical user interface items are tested within the programming environment, wherein the plurality of form skins can be oriented in either portrait or landscape mode.

12. The system of claim 11, wherein each form skin is supplied by a manufacturer of the corresponding portable computer.

13. The system of claim 11, wherein each form skin is represented by an XML file and a graphics file.

14. The system of claim 11, wherein the application code is edited by selecting the associated graphical user interface object.

15. The system of claim 11, wherein each of the plurality of form skins further comprises a softkey, corresponding to an input of the portable computer device.

16. The system of claim 15, wherein each softkey has associated executable code.

17. The system of claim 16, wherein the code is edited by selecting the associated softkey.

18. The system of claim 11, wherein the graphical user interface objects correspond to graphical user interface objects supported by the portable computer device.

19. The system of claim 18, wherein each of the plurality of designer object components render the associated graphical user interface objects in the form to appear similar to the corresponding graphical user interface objects supported by the portable computer device.

20. The system of claim 15, further comprising changing the appearance of a cursor when the cursor is passed over the softkey.

21. The system of claim 15, further comprising a tooltip associated with each softkey.

22. The system of claim 21, further comprising displaying the tooltip associated with the softkey when a cursor is passed over the softkey.

23. The system of claim 11, wherein the form skin is provided using the specifications of the portable computer device.

* * * * *